United States Patent

[11] 3,604,725

| [72] | Inventors | Raymon L. Goff;<br>Frederick Eugene Dion, both of Lafayette, Ind. |
|---|---|---|
| [21] | Appl. No. | 851,542 |
| [22] | Filed | Aug. 20, 1969 |
| [45] | Patented | Sept. 14, 1971 |
| [73] | Assignee | TRW Inc.<br>Lafayette, Ind. |

[54] HYDRAULIC SUSPENSION AND STEERING SYSTEM FOR VEHICLES
22 Claims, 9 Drawing Figs.

| [52] | U.S. Cl. | 280/96.2, 267/64, 267/65, 280/124 F |
|---|---|---|
| [51] | Int. Cl. | B60s 9/00 |
| [50] | Field of Search | 280/96.2, 124 F; 267/64, 65 |

[56] References Cited
UNITED STATES PATENTS

| 2,451,171 | 10/1948 | Mullen | 267/64 |
| 2,992,836 | 7/1961 | Vogel | 280/124 F X |
| 3,179,432 | 4/1965 | Chaneac et al. | 280/124 F |
| 3,387,856 | 6/1968 | Guilhamat et al. | 280/96.2 |

*Primary Examiner*—Leo Friaglia
*Assistant Examiner*—John P. Silverstrim
*Attorney*—Hill, Sherman, Meroni, Gross & Simpson ABSTRACT: A self-contained oleopneumatic strut suspension system for wheeled vehicles accommodating steering of the wheels and including a pneumatic spring-opposing movement of a fluid-supported piston. In the preferred embodiment the gas spring has a bladder disposed in a porous member such as a perforated tube to minimize damage thereto. The system also includes an additional fluid supply source to compensate for the loading of the vehicle and a bypass around the piston to enable limited movement of the piston before adding additional fluid or acting against the gas spring device. In the preferred embodiment, the system includes a steering mechanism mounted on the upper end of the cylinder to rotate the piston to turn the wheel mounted thereon in response to a steering input or force.

INVENTORS
Raymon L. Goff
Frederick Eugene Dion
BY [signature]  ATTORNEYS

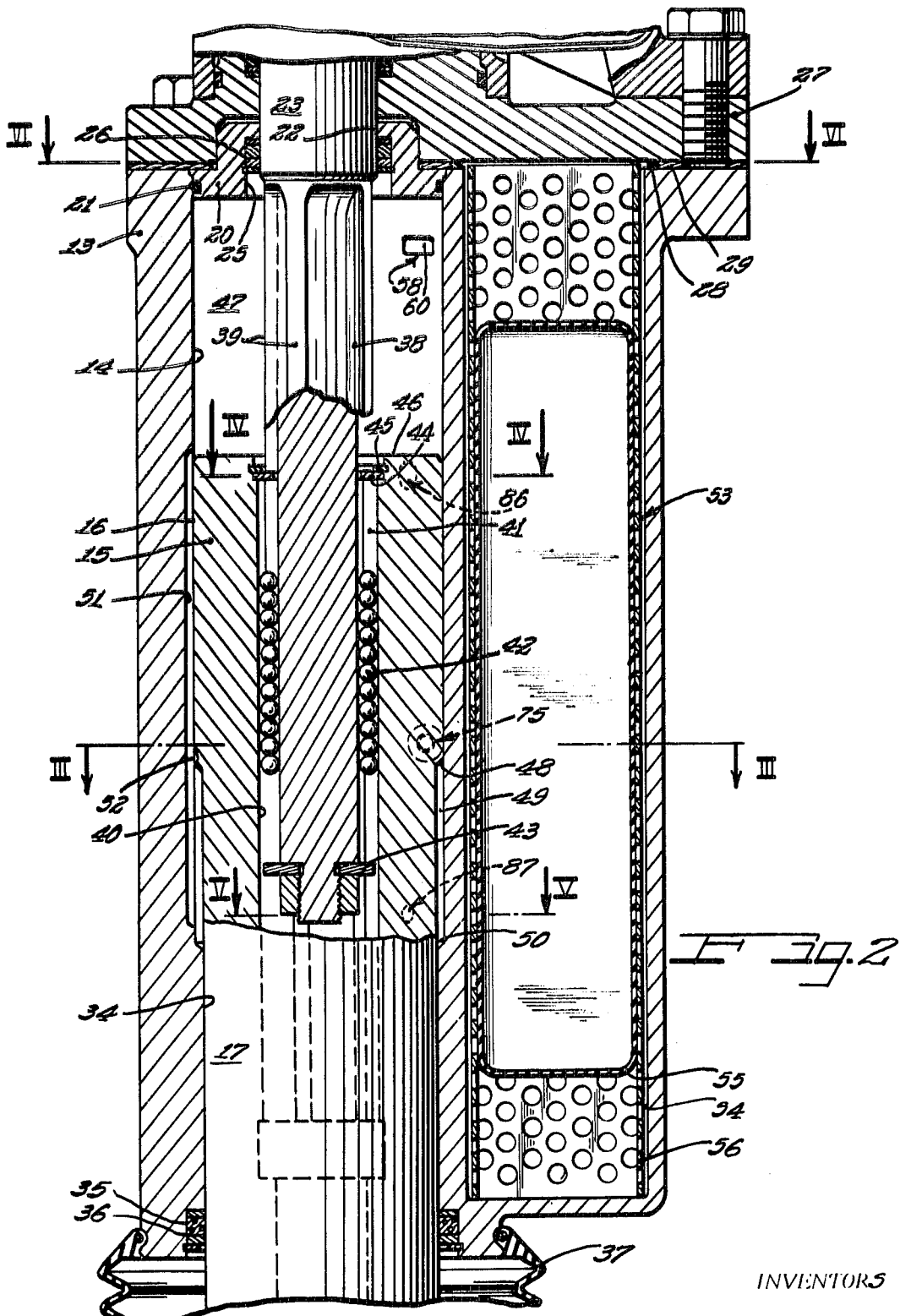

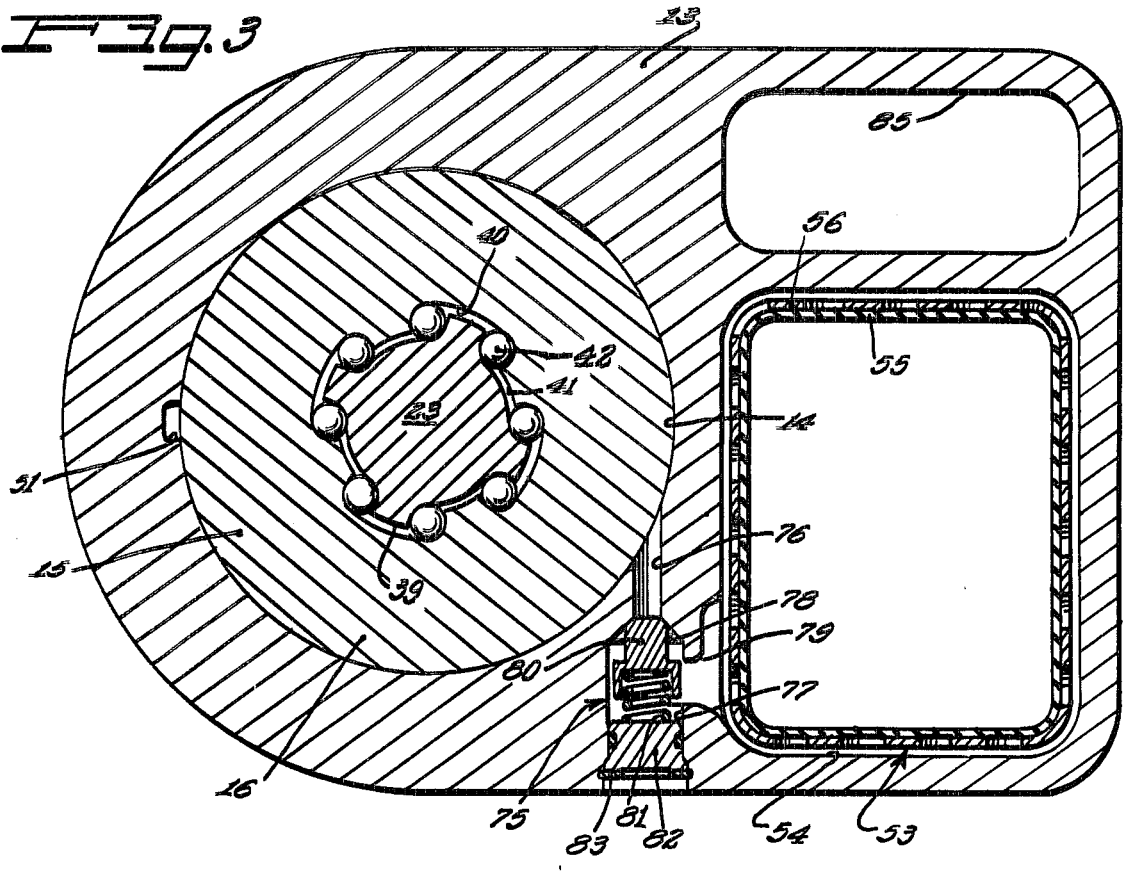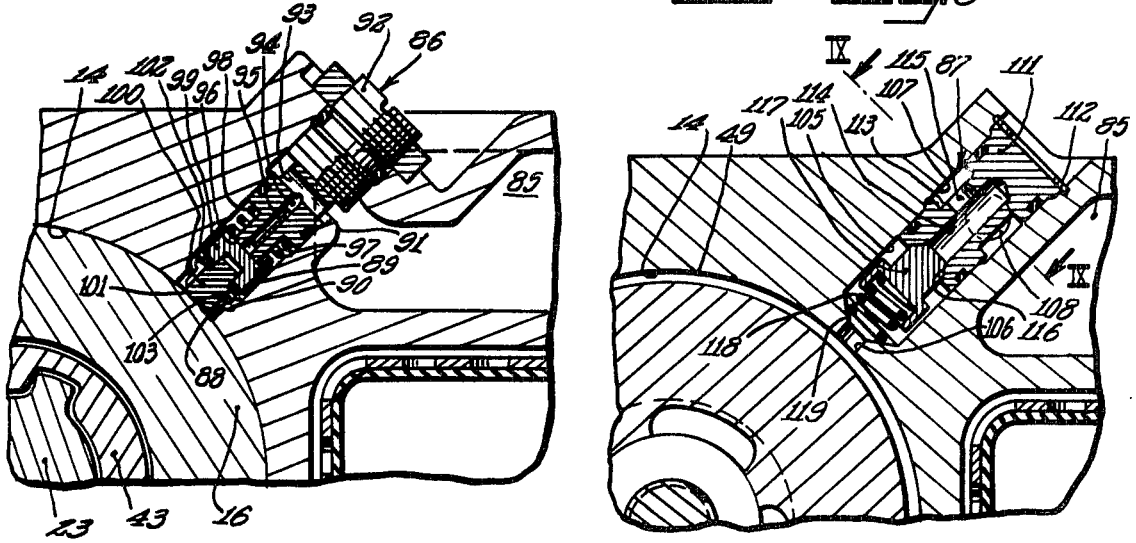

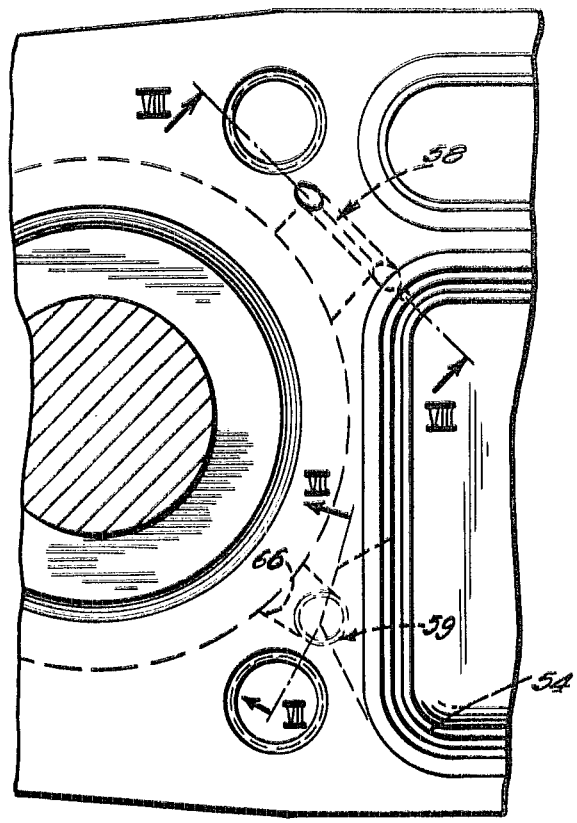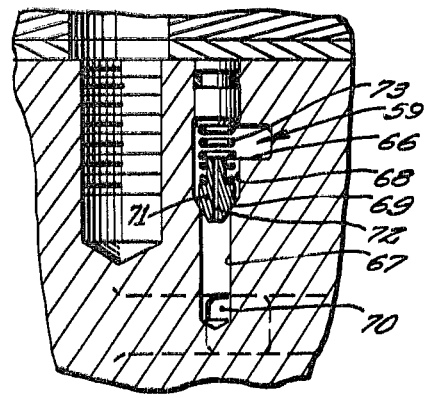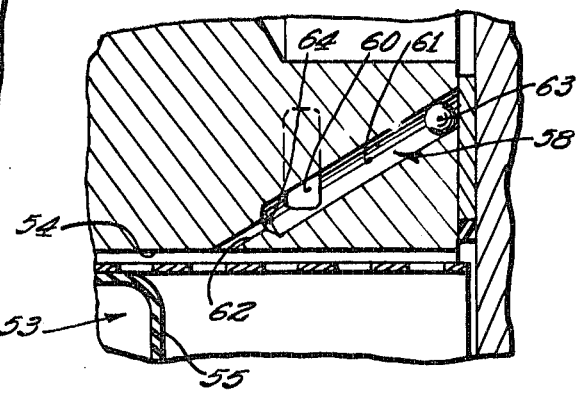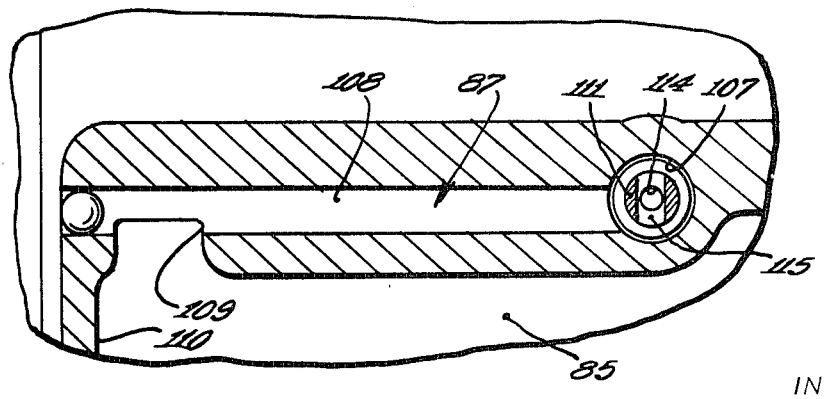

HYDRAULIC SUSPENSION AND STEERING SYSTEM FOR VEHICLES

BACKGROUND OF THE INVENTION

1. Field of the Invention

The present invention is directed to a suspension system for a vehicle and in particular a hydropneumatic suspension and steering system.

2. Prior Art

In conventional suspension systems utilizing mechanical springs, especially in medium or heavy trucks, the unsprung weight of the suspension system creates an unfavorable ride characteristic for the vehicle. Furthermore, leaf springs have a spring function which is linear so that in order to support a heavy load placed on the vehicle the empty vehicle has rough riding characteristics. A conventional spring system using mechanical springs requires the provision of shock-absorbing devices to dampen the movement of the vehicle and to counteract the rebound stroke of the deflected spring.

Various attempts have been made to utilize a hydropneumatic spring device to replace mechanical springs which depend on deflection of the metal part. In such devices a compressible fluid such as gas or air is used to absorb the shocks imparted to a wheel engaging the ground surface by the rough surface. Many of these systems utilize a mixture of a compressible and incompressible fluids such as oil which have the disadvantage of the gas being dissolved in the oil, problems of sealing the mixture in the system and problems with frothing of the mixture due to absorption of the energy while acting as a spring. A further disadvantage of both the mechanical and gas springs presently available is the requirement of the vehicle body being spaced above the ground a sufficient distance to allow for the steerage linkages to the dirigible wheels. The higher displacement of the vehicle above the wheels results in a high center of gravity for the vehicle creating problems with the stability.

SUMMARY OF THE INVENTION

The present invention is directed to a fluid suspension system for a vehicle utilizing a hydropneumatic spring device having the compressible fluid such as air contained in a bladder which is disposed in a reservoir to prevent the dissolving of the air in the incompressible fluids and the frothing of the fluids of the system. The hydropneumatic spring device provides fluid pressure acting on a piston disposed in the cylinder to support the load of the vehicle and to oppose the movement of the piston in the cylinder in either direction to absorb impact loads applied thereto. The system further includes leveling means for changing the volume of incompressible fluid acting on the piston in response to the variations of the loads placed on the suspension system. In the preferred structural embodiment, a steering mechanism is mounted on the top of the cylinder and has a portion connected to the piston for rotating the piston to turn the wheel attached thereto in response to a steering input. Preferably, the entire steering and suspension system is contained in the compact unit requiring no fluid connections with other parts of the vehicle.

Accordingly, it is an object of the present invention to provide a suspension system which is self-dampening and prevents the mixing of the compressible and incompressible fluids.

Another object of the present invention is to provide a suspension system which reduces the unsprung weight to increase the favorable riding characteristics of the system.

Yet another object of the present invention is to provide a suspension system enabling the lowering of the center of gravity of the vehicle to increase the stability thereof.

Yet another object of the present invention is to provide a suspension and steering system enabling the lowering of the center of gravity in the front area of the vehicle and reducing the unsprung weight to improve the riding characteristics and the steering characteristics of the vehicle.

A still further object of the present invention is to provide a suspension system having a leveling system combined therein in a self-contained unit to increase reliability and to prevent contamination of the fluids used therein.

Other objects, features and advantages of the invention will be readily apparent from the foregoing description of certain preferred embodiments taken in conjunction with the accompanying drawings, although various modifications may be effected without departing from the spirit and scope of the novel concepts of the disclosure.

BRIEF DESCRIPTION OF THE DRAWINGS

FIG. 2 is a partial cross-sectional view with parts in elevation for purposes of illustration of the suspension and steering system;

FIG. 3 is a cross-sectional view taken along lines III—III of FIG. 2;

FIG. 4 is a partial cross-sectional view taken along lines IV—IV of FIG. 2;

FIG. 5 is a partial cross-sectional view taken along lines V—V of FIG. 2;

FIG. 6 is a partial cross-sectional view taken along lines VI—VI of FIG. 2;

FIG. 7 is a partial cross-sectional view with portions in elevation for purposes of illustration taken along lines VII—VII of FIG. 6;

FIG. 8 is a partial cross-sectional view with portions in elevation for purposes of illustration taken along lines VIII—VIII of FIG. 6; and FIG. 9 is a partial cross-sectional view taken along lines IX—IX of FIG. 5.

AS SHOWN ON THE DRAWINGS

Figure 1:
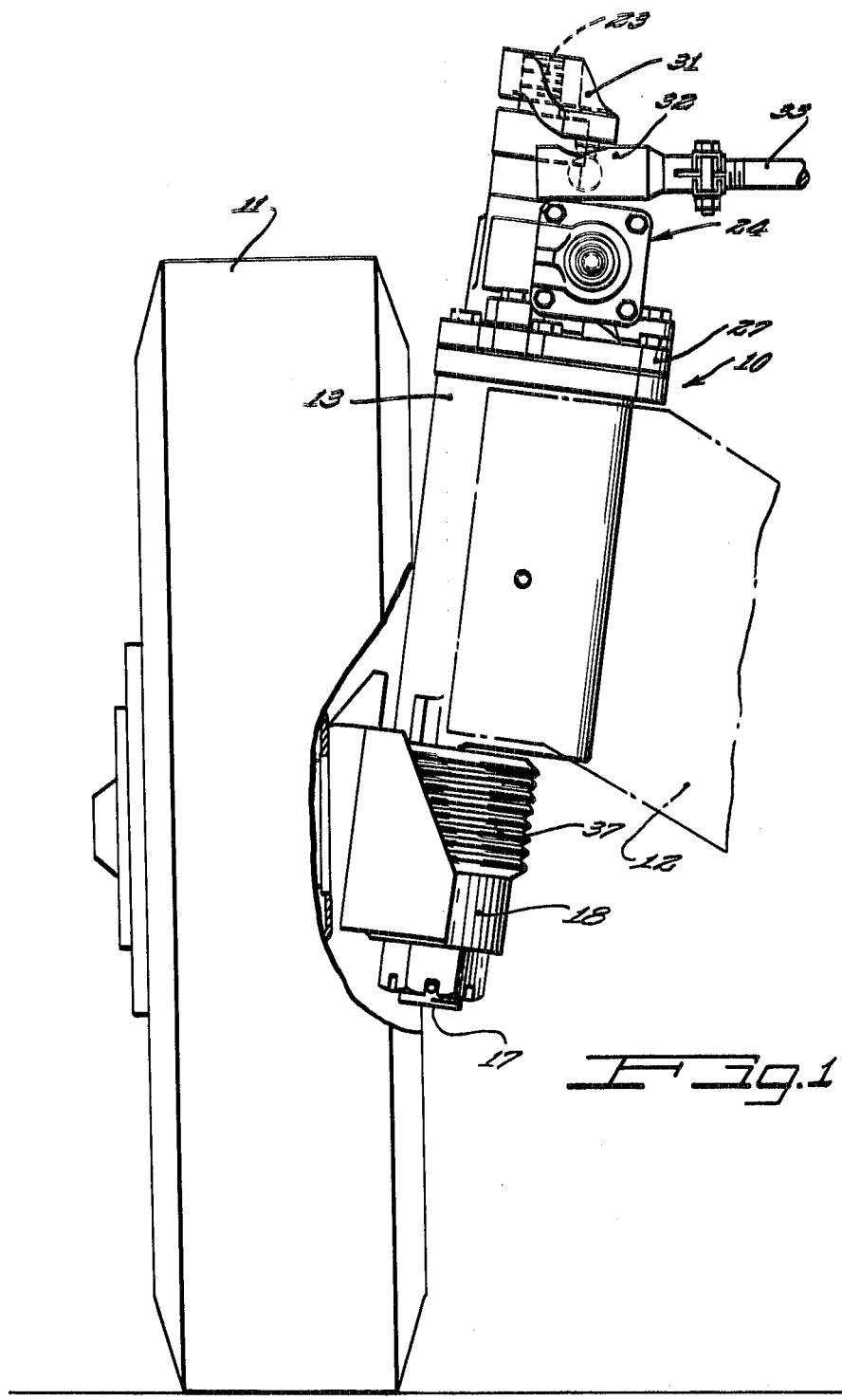
FIG. 1 is an elevational view with parts broken away for purposes of illustration of the suspension and steering system of the present invention.

Although the principles of the present invention are of utility in any suspension system requiring means to absorb shock loads applied thereon, they are particularly useful when incorporated in a suspension and steering system for a vehicle and the embodiment herein shown illustrates a novel structure utilized in a hydropneumatic suspension and steering system generally indicated at 10 in FIG. 1, for connecting a dirigible wheel 11 to a member 12 of a basic support structure of a vehicle. The member 12 is illustrated as a portion of the frame of the vehicle however, it may be any member of a vehicle such as those utilizing a unibody construction which has the frame and body incorporated in a single unit.

As best illustrated in FIGS. 1 and 2, the system 10 includes a housing 13 in which is removably attached to the frame member 12 and has a cavity or bore 14 forming a cylinder for receiving a piston 15 having a head portion 16 with an integral piston rod 17 which is connected to an axle means 18 that rotatably supports the wheel 11. An upper end of the cylinder 14 is closed by a plug or plate 20 having sealing means 21 for forming a fluidtight seal with the cylinder wall and an axial bore 22 for rotatably receiving a shaft 23 of a steering means or mechanism generally indicated at 24 in FIG. 1. The bore 22 is provided with a counterbore 25 which receives steering means or as packing rings 26 to form a fluidtight seal with the shaft 23. Attached to the housing 13 is an upper end or closure plate 27 which clamps seal 28 and the gasket 29 to form a fluidtight seal of the one end of the housing.

As best illustrated in FIG. 1, the steering mechanism 24 is mounted by screws on the end plate 27 and includes means such as a worm gear for rotating the shaft 23 in response to a steering signal or input. The shaft 23 extends through the mechanism 24 and has an arm 31 attached to its upper end. The arm 31 has a ball-and-socket connection 32 for connecting the shaft 23 to a tie rod 33 which extends across the vehicle to link a similar arm for a shaft of the suspension and steering for the other dirigible wheel. The other suspension and steering system does not need the steering mechanism 24 since the rod 33 provides the steering command or input.

As best shown in FIG. 2, the cavity 14 has a small diameter portion 34 for slidably receiving the piston rod 17 and which terminates in a counterbore 35 for receiving sealing means 36 such as the packing ring illustrated. To protect the exposed portion of the piston rod 17 from contamination by dirt or moisture, a flexible dust cover 37 extends from the lower end of the housing 13 to the axle support means 18.

As best illustrated in FIGS. 2 and 3, the shaft 23 which terminates in splined end 38 having splines 39 received in the cavity 40 of the piston 15. Cavity 40 has spines 41 which extend between the splines 39 of the shaft 23 and frictionless bearing means or antifriction means such as balls 42 are disposed between the splines 39 of the shaft and splines 41 of the cavity 40 to minimize frictional engagement therebetween. To prevent the escape of the balls 42, a retainer 43 is attached to the end of the shaft 23 and a retainer or keeper ring 44 is held at the top of the cavity 40 by a ring 45. Both the retainer 43 and the keeper ring 44 have grooves to receive the splines 41 and 39, respectively, to allow axial movement between the splined end 38 and the cavity 40.

When a steering force or input is received by the steering mechanism means 24, it rotates shaft 23 which transfers the rotation to the piston 15 which in turn rotates the axle support means 18 of the wheel 11. Rotation of the arm 31, which is connected with tie rod 33, turns both of the dirigible wheels of the vehicle in unison. The shaft end 38 and the cavity 40 along with the bearing means formed by the ball 42 allow relative axial movement between the piston 15 and the shaft 23 so that the steering or turning of the wheel 11 is unaffected by axial displacement of the piston 15 in the cylinder 14.

The head 16 of the piston 15 has an upper surface 46 which coacts with the cylinder 14 to form a pressure chamber 47. The piston head 16 has a smaller lower annular surface 48 which forms with the cylinder wall 14, a second pressure chamber 49 which terminates at a shoulder 50 between the cylinder wall 14 and the bore 34. To provide communication between chambers 47 and 49, a passageway which is illustrated as a groove 51 enables restricted fluid flow between the chambers 47 and 49 when the piston 15 is in a predetermined range of axial positions in the cylinder 14.

As illustrated, the lower surface 48 has a smaller pressure acting surface than the surface 46. Furthermore, a groove 52 of decreasing depth is provided in the lower surface 48 so that as the lower surface approaches the shoulder 50 the flow of fluid from the chamber 49 is progressively decreased to slow the travel of the piston towards the shoulder 50 and ultimately the groove 52 is covered to prevent further flow and provide a fluid cushion between the metal part to prevent impact therebetween.

The incompressible fluid such as oil in the chamber 47 supports the load of the vehicle applied to the housing 13 by the member 12. To provide a spring system to absorb the shock of the load applied to the wheel 11 and transmitted to the piston 15 to the fluid in the chamber 47, a hydropneumatic or gas spring means generally indicated at 53 is provided. As illustrated, the spring means 53 comprises a second cavity 54 in the housing 13 which is adjacent to the cylinder 14 and substantially parallel thereto to provide a reservoir for the oil and a bladder 55 which contains a predetermined volume of presurized compressible fluids such as a gas or air and is disposed in the reservoir. Preferably the bladder 55 is disposed in a porous hollow member 56 which is illustrated as a perforated tube and which minimizes chances of rupture or damage to the bladder due to unequal application of the fluid pressure thereon. As illustrated, the perforated tube 56 enables the fluid or oil in the reservoir 54 to flow around the bladder and provide for equal application of the incompressible fluid on the bladder 55.

The gas spring means 53 is in communication with the pressure chamber 47 by passageway means 58 and 59. Referring to FIG. 8, passageway means 58 comprises a port 60 in the wall of the cylinder 14 which communicates with an angularly disposed bore 61 having a reduced or restricted portion 62 which is in communication with the cavity 54 of the gas spring means 53 and forms a shoulder 64. A ball 63 is press fit in the passageway means 58 to provide a fluid seal for the upper end thereof.

The second passageway means 59 as best illustrated in FIG. 7 has a port 66 which opens into the cylinder 14. As illustrated, the port 66 is disposed between the port 60 and the plug 20 so that the fluid can flow therethrough even after the piston 15 has covered the port 60. The port 66 extends into a bore 67 having enlarged portions 68 which define a valve seat 69. The bore 67 extends to and communicates with the cavity 54 via port 70 in the wall thereof. A valve member 71 having an orifice 72 is disposed in the enlarged portion 68 and is biased by a spring means 73 into seating engagement on the valve seat 69. The orifice 72 enables a restricted amount of flow from the port 66 to the port 70. However, flow from the port 70 to the port 66 can be a greater amount due to the pressure lifting the valve member 71 from the seat 69.

In operation, upward movement of the piston 15 towards the plug or plate 20 causes fluid to be pumped or forced through both the passageways 59 and 58 to collapse the bladder 55. The force of the fluid to collapse the bladder 55 resists the movement of the piston and then causes a deceleration of its upward movement. Continued movement so that the head 16 of the piston closes the port 60 of the passageway means 58 limits the flow from the chamber 47 to the reservoir 54 through the restricted orifice 72 in the passageway means 59. This restriction causes a further decrease in the speed and velocity of the movement of the piston and when the piston reaches a point to cover the port 66, the remaining entrapped fluid between the surface 46 and the plate 20 creates a fluid cushion to prevent impact between the metal parts.

The cavity 54 of the gas spring 53 is in communication with a lower part of the cylinder 14 by a passageway means generally indicated at 75 in FIG. 2 and best illustrated in FIG. 3. The passageway means 75 comprises a bore 76 having an enlarged portion 77 forming a seat 78. The enlarged portion 77 is in communication with a laterally extending port 79 which extends into the cavity 54 of the gas spring means 53. Disposed in the enlarged portion 77 is a valve member 80 which is urged against the seat 78 by a spring 81 acting therebetween the member 80 and a plug 82 which is retained by a retaining ring 83 in the bore 77. The valve member 80 and the seat 78 coact to form the check valve means limiting flow from the cylinder 14 to the cavity 54 and preventing flow in the reverse direction. Thus an upward movement in the piston 15 from the position illustrated in FIG. 2, will not allow the fluid to flow from the cavity 54 into the chamber 49. However, once the piston 15 has reached an upward position, a downward movement causes fluid entrapped in the chamber 49 to resist the movement and the entrapped fluid is forced into the cavity 54 to act on the spring means 53 through the passageway means 75 until the head portion 16 of the piston 15 covers the passageway or bore 76. It is noted that the location of the passageway 75 is such that when covered by the piston head 16, the groove 51 enables restricted fluid flow between the chambers 47 and 49 for equalization of the pressure therein.

Disposed in the housing 13 alongside of the cavity forming the reservoir 54 is a third cavity 85 as best illustrated in FIGS. 3, 4 and 5. The cavity 85 is a fluid storage means for incompressible fluid such as oil used in the suspension system. The cavity 85 is connected to the cylinder 14 by a pair of axially spaced passageway means 86, 87 (FIG. 2) for admitting fluid from the supply source 85 to the cylinder 14 and for returning fluid from the cylinder 14 back to the cavity 85.

Passageway means 86 which is best illustrated in FIG. 4 comprises a port formed by a bore 88 in the cylinder 14. The bore 88 has an enlarged portion 89 which forms a shoulder 90 therebetween. The enlarged portion 89 is in communication with the port 91 which opens into the cavity 85. A bleed valve means 92 is threadedly received in the outer portion of the bore 89 and has a passageway 93 in fluid communication with the port 91 which intersects an axially extending passageway 94. Disposed in the passageway 94 terminates in a valve seat 96. Adjacent to seat 96 is an external shoulder 97 which receives a spring 98. The valve seat 96 is closed by a valve member 99 which is biased to the open position by the spring 98. The valve member 99 is held on the seat 96 by a member 100 having a curved surface 101 which contacts the side of the piston head 16 to hold the valve member against the seat 96. To prevent damage to the valve seat 96, a spring means 102 such as a spring washer transfers the force from the member 100 to the valve member 99.

In operation, the bleed passageway 86 is held closed by the contact of the member 100 on the head 16 of the piston 15. When the piston is axially displaced towards the shoulder 50 (FIG. 2) to uncover the passageway 86, the spring 98 forces a valve member 99 away from the seat 96 until the shoulder 103 of the member 100 is engaged on the shoulder 90 of the passageway. With the passageway open, the fluid in the chamber 46 can flow or bleed into the cavity 85 of the fluid supply means. When the piston 15 moves axially upwardly to cover the passageway means 86, the piston contacts the member 100 and forces the valve member 99 against the valve seat 96 to prevent further bleeding of the fluid to the cavity 85.

The passageway means 87 as best illustrated in FIGS. 5 and 9 comprises a bore 105 having a restricted portion 106 in communication with the cavity 14 and an outer enlarged portion 107 extending towards the exterior of the outlet. Enlarged portion 107 intersects a second bore 108 extending parallel to the cavity 85 which intersects the cavity at a port 109 adjacent the bottom 110 of the cavity. Disposed in the enlarged portion 107 is a valve seat member 111 provided with seal means and held in by a retaining ring 112. The valve body 111 has an annular groove 113 and an axial extending bore 114 connected to the groove 113 by lateral bore 115. The bore 114 terminates in the valve seat 116 which cooperates with the valve member 117 biased or urged against the seat 116 by a spring 118 acting between a shoulder 119 formed by the joint or restricted portion 106 with the bore 105. The valve formed by the member 117 and the seat 116 acts as a check valve means which permits flow of a fluid from the cavity 85 through the passageway 108, 107 and 106 into the cylinder 14. However, the check valve means prevents the flow of fluid from the chamber 49 back to the cavity 85.

In operation of the suspension system 10, as best illustrated in FIG. 2, the piston 15 seeks an equilibrium point where the head 16 closes the passageway means 86 which is the bleed passageway to cavity 85 of the supply fluid means. If the loading of the vehicle is such that the fluid pressure in the chamber 47 created by the volume of oil and pressure in the bladder 55 is greater than necessary and displaces the piston 15 towards the shoulder 50 of the cylinder 14, the bleed passageway 86 will be open and allow bleeding off of some of the fluid in the chamber 47 until the piston resumes the position in which the bleed passageway means is closed. If the loading on the vehicle is sufficient to cause compression of the fluid in the bladder 55 of the gas spring means 53 so that the piston 15 moves upwards toward the port 60 until the groove 51 does not extend past the upper surface 46, a suction is created in the chamber 49 causing the opening of the check valve means formed by the valve member 117 and the seat 116 to draw additional fluid into the chamber 49. After the addition of fluid through the passageway means 87, any reciprocation of the piston 15 in the cylinder 14 will cause pumping of the fluid in the chamber 49 through the passageway means 75 into the reservoir 54 of the spring means 53. Such pumping will increase the volume of oil in the reservoir 54 to increase the combined pressure of the gas and oil of the system to increase the pressure acting on the upper face 46 of piston 15 causing it to move toward the equilibrium position illustrated. The function of the cavity 85 and the passageways 86 and 87 is to provide a leveling means for the suspension system 10.

While traveling on a road, rough road conditions causing impact to the wheel 11 are transferred via the axle means 18 to the piston rod 17 which causes the piston 15 to move toward the port 60 to apply an increase pressure on the fluid in the chamber 47. Any pressure applied to the fluid in the chamber 47 is transmitted through the passageway means 58 to the gas spring means 53 whose bladder 55 by being collapsed by the increased pressure absorbs the force applied to the piston 15 to decelerate its movement. The upward movement of the piston 15 stops the communication between the chamber 47, 49 through the groove 51 which enables slight axial displacement without actuating the leveling means or being opposed by the spring means 53. Thus, further upward movement causes a suction to be developed in the chamber 49 which draws additional fluid from the fluid supply cavity 85 through the valve means or passageway 87. As mentioned above, continual movement due to a heavy impact on the piston 15 via the wheel 11 is resisted by the gas spring means 53. However, if the impact is sufficient to cause the piston to travel past the port 60 of the passageway 58, then the restricted orifice 72 of the passageway 89 causes kinetic absorption of energy to increase the deceleration of the piston. Once the port 66 of the passageway 59 is closed by the head 16 of the piston 15, a fluid cushion prevents the impact of the piston surface 46 on the plate or plug 20.

With the removal of the impact load on the piston 15, the expansion of the gas in the bladder 55 causes the fluid in the reservoir 54 and the chamber 47 to force the piston downward. This downward force is resisted and dampened by the fluid entrapped in the chamber 49 even though part of the fluid in that chamber is forced through the passageway means 75 into the cavity 54 to act against the gas spring means 53. Once the piston has traveled toward the shoulder 50 sufficiently to uncover the groove 51 to allow communication between the chambers 47 and 49, the pressure in each chamber will become balanced and further forcing of fluid through the passageway means 75 is stopped. Since additional fluid had been added from the fluid supply during the travel of the piston in response to an impact load, the pressure acting on the piston is greater than necessary for the load on the vehicle. Thus a new equilibrium point of the piston due to the difference in the size of the piston surfaces 46 and 48 will be lower than the desired equilibrium point and the bleed passageway 86 is uncovered to allow bleeding of the excess fluid back to the supply cavity 85 to obtain the required fluid pressure in the system to support the load of the vehicle. As the fluid is bled from the chamber 47 to the supply cavity 85, the piston will move axially upward until an equilibrium is reached with the head 16 of the piston 15 closing the bleed valve means 92 and stopping the removal of fluid from the chamber 47.

If the wheel 11 falls into a hole, its movement causes the piston to move toward the shoulder 50. Since the groove 51 allows restricted communication between the chambers 47, and 49, the movement of the fluid from the chamber 49 to the chamber 47 is restricted and decelerates the movement of the piston. However, if the piston continues to move downward, the lower end of the groove 51 will be covered by the head 16 of the piston 15 and the fluid entrapped between the surface 48 and shoulder 50 is forced through the groove 52 which continually decreases in size as the piston approaches the shoulder 50. Finally, the groove 52 will be covered to provide a fluid cushion between the shoulder 50 and the piston surface 48, therebetween. As illustrated, only one groove 52 is shown however, since the piston 51 is rotated by the steering mechanism 24 while turning the wheel 11, a series of the grooves 52 are formed along the outer surface 48 so that at least one will be in registry with the communication groove 51 in the side of the cylinder 14.

The suspension system 10 utilizes an incompressible fluid such as oil and a compressive fluid which can be air or any desired gas. As pointed out hereinabove, the compressible fluid is contained in the bladder 55 to prevent its dissolving in the oil to cause a drop in the pressure of the system. Although not illustrated, the bladder can be provided with a valve means to allow charging of the gas contained therein or the changing of the pressure of the gas therein as desired.

As illustrated and described, the suspension system 10 which is illustrated as also including a steering system, is a single unit including a leveling means, a gas-oil spring means, dampening means and an integral steering means. Thus, the hydropneumatic suspension and steering system 10 can be easily attached to existing vehicles or can be easily assembled to new vehicles being manufactured with reduced cost for the vehicle due to the replacement of such items as shock absorbers whose function it performs and due to the complete assembly of the system to the vehicle with relatively few connections.

We claim as our invention:

1. A suspension system for mounting a ground-engaging wheel member to a member of a basic support structure of a vehicle comprising:
    a housing adapted for attachment to one of said members and having means forming a cylinder with at least one end thereof closed;
    a piston adapted for attachment to the other of said members, said piston being disposed in said cylinder and defining therewith a chamber between said one end and the piston;
    a gas spring having a gas-filled flexible bladder disposed in a fluid reservoir; and
    passageway means interconnecting said gas spring to said chamber at a predetermined distance from said one end of said cylinder so that movement of the piston toward said one end of said cylinder is opposed by said gas spring and movement of said piston past said passageway means towards said one end is opposed by a cushion formed by fluid trapped at said one end of the cylinder.

2. A suspension system according to claim 1 wherein said chamber is a load-supporting chamber, wherein said piston defines a second chamber with said cylinder, said second chamber is connected to the gas spring by second passageway means including a valve means to prevent flow from the gas spring to the second chamber so that fluid is forced from either chamber into the reservoir of the gas spring during reciprocation of the piston in the cylinder but is returned only to the load supporting chamber.

3. A suspension system for mounting a ground-engaging wheel member to a member of a basic support structure of a vehicle comprising a housing adapted for attachment to one of said members, said housing having means defining a cylinder, a piston adapted for connection to the other of the members, said piston being reciprocably disposed in said cylinder and defining a pair of fluid chambers therewith, a gas spring comprising a bladder means containing a predetermined volume of pressurized compressible fluid disposed in a fluid reservoir, passageway means interconnecting each of said chambers with said gas spring means connecting one of said pair of chambers including valve means for preventing fluid flow from said gas spring to the one chamber so that an increased pressure applied to the fluid in each of said chambers during reciprocation of said piston in said cylinder is applied against said said bladder means to oppose the reciprocation, means regulating the amount of fluid in each of said chambers to compensate for changes in the loading of the vehicle, and means communicating fluid between said chambers enabling a limited relative movement between said cylinder and piston whereby relative movement between said cylinder and piston greater than the predetermined limited amount is opposed by the pressure of the fluid in the bladder means of the gas spring.

4. A suspension system according to claim 3, wherein said housing is adapted to be attached to said basic support frame member and wherein means adapted for connection to a steering input is mounted on the top of said housing and includes means extending into said cylinder to rotate said piston in response to the steering input.

5. A suspension system according to claim 4, wherein said means extending into said cylinder includes means forming a slidable connection between said piston and said connector means enabling relative movement therebetween.

6. A suspension system according to claim 5, wherein said slidable connection includes substantially frictionless bearing means acting between said extending means and said piston.

7. A suspension system according to claim 3, wherein the other of said pair of chambers is a load-supporting chamber of said system and said passageway means interconnecting said load-supporting chamber to said gas spring permits flow of fluid in either direction.

8. A suspension system according to claim 7, wherein said passageway means interconnecting said other chamber to said gas spring includes axially spaced port means in said cylinder so that a flow of fluid from said other chamber to said gas spring means is reduced as said piston approaches the end of said cylinder to increase the resistance to the movement of said piston in said chamber.

9. A suspension system according to claim 8, wherein said port means are axially spaced from the end of said cylinder to provide a fluid cushion to prevent metal-to-metal contact between said end of said cylinder and said piston.

10. A suspension system according to claim 7, wherein said fluid-regulating means includes valve means enabling the fluid to enter the one chamber during a pressure drop therein and bleed valve means actuated by said piston for draining fluid from said cylinder when the pressure of the fluid therein is greater than that required to support the load applied to said system.

11. A suspension system according to claim 10 wherein said gas spring and said fluid-regulating means are contained in said housing.

12. A suspension system for mounting a dirigible wheel to a base support structure of a vehicle comprising
    a housing for connecting to the basic support structure in fixed assembly, and having a cylinder formed therein,
    a piston reciprocally and rotatably carried in said cylinder, and having a piston rod extending from one end of the cylinder means on said piston for connecting the same fast to the dirigible wheel for joint turning movement therewith,
    a shaft rotatably mounted on said housing one end of which is adapted for connection to steering for rotating same and the other end of which extends into the other end of said cylinder,
    means interconnecting said shaft and said piston for joint rotation and for relative axial shifting.

13. The suspension system as defined in claim 12 wherein said interconnecting means comprises
    means forming a cavity in said piston for telescopically receiving said other end of said shaft,
    cooperating spline means formed on said shaft and on said piston in the wall of said cavity, and
    a plurality of balls disposed in said splines to provide an antifriction bearing.

14. The suspension system as defined in claim 12 and including a gas-filled completely enclosed flexible bladder communicating with said cylinder and subject to the pressure in said cylinder for providing an air cushion for said piston.

15. A suspension system for mounting a dirigible wheel to a basic support structure of a vehicle comprising a housing adapted for attachment to a basic support structure of a vehicle, said housing having means defining a cylinder, a piston adapted for attachment to the dirigible wheel, said piston being disposed for reciprocation in said cylinder and defining a pair of chambers therewith, a gas spring means including a bladder means containing a predetermined volume of pressurized gas disposed in a fluid reservoir, passageway means interconnecting each of said chambers to said gas spring means with the passageway means connecting one of said pair of chambers including valve means for preventing fluid flow from said gas spring to the one chamber so that movement of said piston in said cylinder is resisted by said gas spring means, and steering means mounted on the housing and connected to said piston, said steering means being adapted for connection to a steering system of said vehicle to rotate said piston in response to a steering input to transmit said input to the dirigible wheel so that said dirigible wheel is supported and steered by said suspension system.

16. A suspension system according to claim 15 wherein said steering means is connected to said piston by a telescopic connecting means enabling reciprocation between the said piston and said steering means.

17. A suspension system according to claim 15 wherein said telescopic connecting means includes a spline shaft received in a splined bore with antifriction means disposed therebetween to minimize forces of the telescopic connecting means resisting reciprocation of said piston.

18. A system for hydrogaseous suspension of a wheel member to a member of a basic support structure of a vehicle comprising a housing adapted for attachment to one of said members and having a cavity forming a cylinder, a piston disposed for reciprocation in said cylinder to form a pair of pressure chambers therewith, said piston having a rod extending out of the cylinder and adapted for attachment to the other of said members, a gas spring means including a reservoir with a bladder of a predetermined volume of pressurized gas disposed therein, means interconnecting each of the chambers with said gas spring means with the interconnecting means for one of said pair of chambers including means for preventing fluid flow from said gas spring means to the one chamber so that relative movement between said members is resisted by the volume of pressurized gas in said bladder.

19. A suspension system according to claim 19 wherein said bladder is disposed in a porous member and contained thereby to minimize damage to the bladder.

20. A suspension system according to claim 19 wherein said porous member is a perforated tube.

21. A system for suspension of a wheel member to the member of a basic frame structure of a vehicle comprising a housing adapted for attachment to one of the members and having a first cavity forming a cylinder with a first and second end, a second cavity adjacent said first cavity defining a reservoir, a bladder of pressurized gas disposed in said reservoir defining a gas spring means, a piston disposed for reciprocation in said cylinder to form a first and second pressure chamber extending between the piston and said first and second ends respectively, said piston having a rod extending out of the cavity and adapted for attachment to the other of the members, first passageway means interconnecting said first chamber of said cylinder to said reservoir, second passageway means interconnecting said second chamber of said cylinder to said reservoir, said second passageway means having check valve means permitting flow of a fluid from said second chamber to said reservoir, and fluid supply means having a first bleed passageway including valve means actuated by said piston enabling draining of fluid from said first chamber as the piston moves toward said second end, and second fluid supply means including check valve means enabling fluid to enter said second chamber as said piston moves toward said first end so that said first fluid supply means removes fluid from said first chamber to shift the piston to the desired equilibrium position and said second supply means enables the addition of fluid to said second chamber as a piston moves toward said first end of said cylinder, the relative movement of said piston in said cylinder being opposed by the pressurized gas in the bladder acting on fluid in said system.

22. A system according to claim 21 wherein said cylinder includes means interconnecting said first and second chambers enabling limited relative movement of the piston therein at the equilibrium position without drawing in additional fluid from the second fluid supply means.

UNITED STATES PATENT OFFICE
CERTIFICATE OF CORRECTION

Patent No. 3,604,725   Dated September 14, 1971

Inventor(s) Raymon L. Goff and Frederick Eugene Dion

It is certified that error appears in the above-identified patent and that said Letters Patent are hereby corrected as shown below:

Column 2, line 60; "steering" should read --sealing--;
         line 61, "or" should read --such--;
         line 75; --tie-- should be inserted before "rod".

Column 3, line 9, --is-- should be inserted before "received";
         line 11, --substantially-- should be inserted before ---frictionless--.

Column 6, line 64, --;-- should be inserted after "shown".

Column 7, line 53, --with the passageway-- should be inserted after "spring";
         line 58, "said" (first occurrence) should be deleted.

Column 8, line 15, "means" should be deleted.

Column 9, line 12, --bearing-- should be inserted after "antifriction";
         line 30, "claim 19" should read --claim 18--.

Signed and sealed this 5th day of December 1972.

(SEAL)
Attest:

EDWARD M. FLETCHER, JR.
Attesting Officer

ROBERT GOTTSCHALK
Commissioner of Patents